United States Patent
Schulte-Hinsken et al.

[11] Patent Number: 5,215,423
[45] Date of Patent: Jun. 1, 1993

[54] SYSTEM FOR DETERMINING THE SPATIAL POSITION OF AN OBJECT BY MEANS OF A VIDEO OPTICAL SENSOR

[75] Inventors: Stefanie Schulte-Hinsken, Aarau, Switzerland; Johannes Kirchhoff, Iserlohn, Fed. Rep. of Germany

[73] Assignee: Edelhoff Polytechnik GmbH & Co., Iserlohn, Fed. Rep. of Germany

[21] Appl. No.: 586,448

[22] Filed: Sep. 21, 1990

[51] Int. Cl.⁵ .......................... B65F 3/04; G01S 13/04
[52] U.S. Cl. ........................................ 414/408; 901/47
[58] Field of Search ............... 414/303, 406, 407, 408, 414/409, 909; 901/6, 47

[56] References Cited

U.S. PATENT DOCUMENTS

| | | | |
|---|---|---|---|
| 3,874,534 | 4/1975 | Brisson | 414/406 |
| 4,281,342 | 7/1981 | Ueda et al. | 901/47 X |
| 4,427,880 | 1/1984 | Kanade et al. | 901/47 X |
| 4,519,193 | 5/1985 | Yoshida et al. | 901/6 X |
| 4,613,942 | 9/1986 | Chen | 901/47 X |
| 4,652,205 | 3/1987 | Ross et al. | 901/47 X |
| 4,715,767 | 12/1987 | Edelhoff et al. | 414/408 |
| 4,753,569 | 6/1988 | Pryor | 901/47 X |
| 4,834,531 | 5/1989 | Ward | 356/5 |
| 4,868,796 | 9/1989 | Ahrens et al. | 367/96 |
| 4,881,809 | 11/1989 | Thierry | 356/5 |
| 4,975,016 | 12/1990 | Pellenc et al. | 414/555 X |
| 5,004,392 | 4/1991 | Naab | 414/21 |
| 5,033,930 | 7/1991 | Kraus | 414/408 |

FOREIGN PATENT DOCUMENTS

| | | | |
|---|---|---|---|
| 078011 | 5/1983 | European Pat. Off. | |
| 0214453 | 3/1987 | European Pat. Off. | |
| 0254634 | 1/1988 | European Pat. Off. | |
| 0263952 | 4/1988 | European Pat. Off. | 901/47 |
| 0327948 | 8/1989 | European Pat. Off. | 414/408 |
| 0388618 | 9/1990 | European Pat. Off. | 414/408 |
| 3612144 | 10/1987 | Fed. Rep. of Germany | 901/47 |
| 3840677 | 6/1990 | Fed. Rep. of Germany | 901/47 |
| 0251722 | 11/1987 | German Democratic Rep. | 901/47 |

OTHER PUBLICATIONS

Published International Application WO 87/02797 of May 5, 1987.
Japanese Abstract, vol. 13, No. 050(P-823) 6; Hideki of Feb. 6, 1989.
Publications-Optical Sensors for Position Measurements, Lutz and Goror published in Sensors and Actuators 17, 1989, pp. 329-338.

Primary Examiner—Michael S. Huppert
Assistant Examiner—James Keenan
Attorney, Agent, or Firm—Morgan & Finnegan

[57] ABSTRACT

There is disclosed a system for determining the spatial position of an object with a video optical sensor which detects predetermined features of this object and generates signals which correspond to the features, the signals being then processed in an electronic computer connected to a control handling circuit of a handling apparatus, such as a garbage collecting truck provided with a pick-up claw and a lifting and tipping mechanism for picking up the garbage can which is provided with a receiving pocket for the pick-up claw. In the system, the object, such as the garbage can, is provided with at least three retroreflective marks arranged in a predetermined pattern, angularly related to each other and illuminated by a light source, and a semiconductor area having an area sensor disposed in juxtaposition to and in spatial association with the light source so that the pick-up claw is guided into the receiving pocket of the can for lifting and tipping thereof to empty it.

8 Claims, 4 Drawing Sheets

SYSTEM FOR DETERMINING THE SPATIAL POSITION OF AN OBJECT BY MEANS OF A VIDEO OPTICAL SENSOR

This invention relates to a system for determining the spatial position of an object by means of a video optical sensor. More particularly, this invention relates to a system of the aforementioned kind which will detect predetermined features of the object and generate signals which correspond to the position of such features and which are processed in an electronic computer, preferably in order to control handling means.

BACKGROUND OF THE INVENTION

In a system which is known from European Patent Publication 214,453, which corresponds to U.S. Pat. No. 4,868,796 of Sep. 19, 1989, and serves to determine the position of an object relative to handling means, at least three spaced apart ultrasonic sensors are provided, which are directed at an angle to a common reference plane and detect elongate line-like features, by which the sound waves of the sensors are reflected parallel to the direction of incidence. Handling means which are controlled by ultrasonic sensors have only a relatively limited field of application because the detection of an object will not be ensured, on principle, unless the distance from the ultrasonic sensors to the ultrasonic reflectors is not in excess of 500 to 700 mm.

It has previously been believed that video optical sensors are less suitable for a determination of the position of objects and for generation of signals for controlling handling means because such sensors are subject to strong restrictions due to the current illuminating conditions, color contrasts and the features to be detected. For this reason it is an object of the invention to provide a system of the kind stated first hereinbefore which is robust and immune to interference and permits the reliable detection of objects and the determination of their spatial position and which will generate signals that correspond to the measured position of an object and can be processed by an electronic computer.

BRIEF STATEMENT OF THE INVENTION

In a system which is of the kind described first hereinbefore that object is accomplished in accordance with the invention in that the object is provided with at least three retroreflective marks, which are arranged in a predetermined pattern and angularly related to each other, the marks being illuminated by a light source, and a semiconductor camera consisting of an area sensor (CCD camera) is provided in juxtaposition to and in spatial association with the light source. By means of the system in accordance with the invention, objects designated by the retroreflective marks can be detected with a high reliability even from a relatively large distance.

DESCRIPTION OF THE PREFERRED EMBODIMENTS

The semiconductor camera preferably consists of an area sensor and is a so-called CCD camera which may have a surface provided with 248 light-sensitive elements per row and per column to provide a high resolution. In addition, the area sensor provided with that surface has a radiometric resolution of the 256 gray steps, so that a sufficiently exact sensible detection of the retroreflective marks will be ensured even from a relatively large distance.

The concept of the retroreflective marks resides in the fact that they reflect light on principle in the direction from which they are irradiated regardless of the angle of incidence of the light in the working range of the retroreflective marks.

By suitable design, it is to be ensured that the optical axis of the camera is as close as possible to the optical axis of the illumination, and in an ideal case coincides with the optical axis of the illumination, because in such a case light will be reflected by the retroreflectors to the sensor area of the camera with the highest intensity. Due to their high contrast, retroreflecting marks are particularly suitable for automatic detection of points in a field of view.

The contrast between the retroreflective marks and the surrounding area in the field of view may be intensified by the provision of a suitable filter or filters located in front of the camera. For that purpose a camera is suitably employed which will transmit only certain frequencies in a narrow band so that the filter or filters will reduce or eliminate any interfering influences coming from the environment and a sharp distinction between the marks and their environment will be effected.

The determination of the position of the object will be based on certain points, which are suitably formed by the centers of the preferably circular retroreflective marks. The centers of the retroreflective marks which appear in the image are determined by a conventional determination of the center of gravity.

The number and the geometric arrangement of the marks relative to each other are taken into account in the evaluation of the image. Five marks are suitably attached to the object. The arrangement of the marks will determine the accuracy with which the position of the object can be determined.

It is apparent that the object itself is not utilized for a determination of its position, but rather a pattern that has artificially been attached to the object and consists of the retroreflective marks is utilized for that purpose. Due to its properties and its geometry that pattern distinguishes from the natural environment and for this reason can reliably be detected by the camera. The position of the marks is determined by means of the CCD camera, which has an object angle that matches the desired working range of the handling means which are to be controlled. The camera takes an image of the pattern in its environment and transmits that image to the image processing system for an arithmetic on-line processing. It is assumed that the spatial position of the marks relative to the object to be detected is known. By means of additional illuminating means, the retroreflective marks are stimulated to reflect and the measuring set-up ensures that maximum reflections from the irradiated marks will appear in the image generated by the camera.

The gray value image which is taken by the camera is suitably converted to a binary image for the further processing. For that purpose the gray values are compared with a threshold value and are associated with a (black) background and a (white) foreground, respectively, depending on whether they are below or above the threshold value. In this case, therefore, the threshold value should be selected so that the bright marks constitute the foreground and the remaining area of the image is associated with the background as far as possible. Thus, a dynamic adaptation of the threshold value dependent on the changing conditions of illumination and the changing environment of the objects is suitably effected. The information on the selected threshold value is derived from the gray value histogram.

As a result of the higher contrast achieved by means of a filter or filters, the marks will generate the local peak with the highest gray value. That method is adopted for the selection of the threshold value. The thus determined threshold value is used as a basis for the binarization.

The processing of the retroreflective marks which have been detected may be effected by a so-called global scene analysis and a local scene analysis.

The global scene analysis will be used to derive from the image the coordinates of the centers of the marks. The binary image is segmented to determine the coherent white areas of the image. Properties, such as the coordinates of the centers of gravity, the areas and, optionally, the side lengths of the circumscribed rectangles are derived from the segments thus defined.

Interfering segments will occur depending on the light conditions. Therefore, care is taken in the allocation of light conditions so that the desired marks will be distinguished from such interfering segments. Such interfering segments are constituted in the image by areas which have such gray values that they are associated with white areas as a result of the binarization and do not represent the marks. The number of interfering segments which appear in the binary image will depend on the environment and on the current light conditions. Preliminary information which is obtained from the desired image segments may be used for a determination of criteria by which the retroreflective marks can be distinguished from the remaining segments. The criteria for the marks appearing in the image may consist of their maximum area, their minimum area, the minimum and maximum edge lengths of the circumscribed rectangle, and the positions of the marks relative to each other. The largest possible area of a mark which appears in the image will depend on the shortest distance between the camera and the object and the real size of the marks. The minimum area will be determined by the minimum reliability of detection which is desired. The limits for the edges will depend on the positions which may be assumed by the object relative to the camera.

Five retroreflective marks are desirably provided and in that case the central point is particularly used for a separate detection of two juxtaposed objects.

Depending on the result of the so-called global scene analysis which has been described hereinbefore, the so-called local scene analysis may be used to determine the position of the object. In accordance with the invention, the object can be detected spatially with a single camera because preliminary information is available, such availability residing in the fact that the space coordinates of the marks relative to a system of coordinates that depends on the object are assumed to be known. The position of the can relative to the camera can be determined from such known space coordinates.

If five retroreflective marks are provided, four of which constitute the corners of a rectangle and the fifth mark is disposed on the point of intersection of the diagonals of the rectangle, each mark disposed at a corner may constitute a redundant mark. In such a case, the coordinates of the object can be determined by a detection of three points, provided they do not lie on a straight line. But for a higher accuracy it is desired to detect more than three points so that the additional points will provide for a certain overdetermination and the points may check each other.

The marks suitably consist of retroreflective sheets.

In accordance with a further feature of the invention the marks are provided on the front side, suitably on the upper skirt, of a garbage can which is provided with at least one pocket for receiving a pick-up claw and the computer controls means for driving the pick-up claw of the lifting and tipping mechanism of a garbage truck. In such a design, the system in accordance with the invention will permit an automatic picking up and tipping of garbage cans which are ready to be picked-up. The video optical detection of the cans is suitably effected by means of a semiconductor camera, which is mounted on a bracket behind the windshield of the garbage collecting truck and is thus operable independent of weather conditions and protected from being soiled by the surrounding environment and at the same time permitting an operator to view the region in front of the truck on one side without substantially limiting the distance of his view. Even in the brightest sunshine, the retroreflective marks are irradiated by a light projector so that the retroreflective marks will always be detected by the camera under such conditions.

The garbage collecting truck is suitably provided adjacent to the instrument panel with a monitor which displays the image taken by the semiconductor camera, the image is evaluated by the computer, and a computer-controlled control of the pick-up claw is effected in response to the actuation of the activating switch.

Because the coupling and picking up of the can will automatically be effected by the system in accordance of the invention, it is necessary for the sake of safety to provide a radar unit, which monitors the range of movement of the pick-up claw and which will arrest movement thereof when the radar unit detects an additional movement in the surveillance area.

THE DRAWINGS

An illustrative embodiment of the invention will now be explained in more detail with reference to the drawings, in which.

Figure 1:
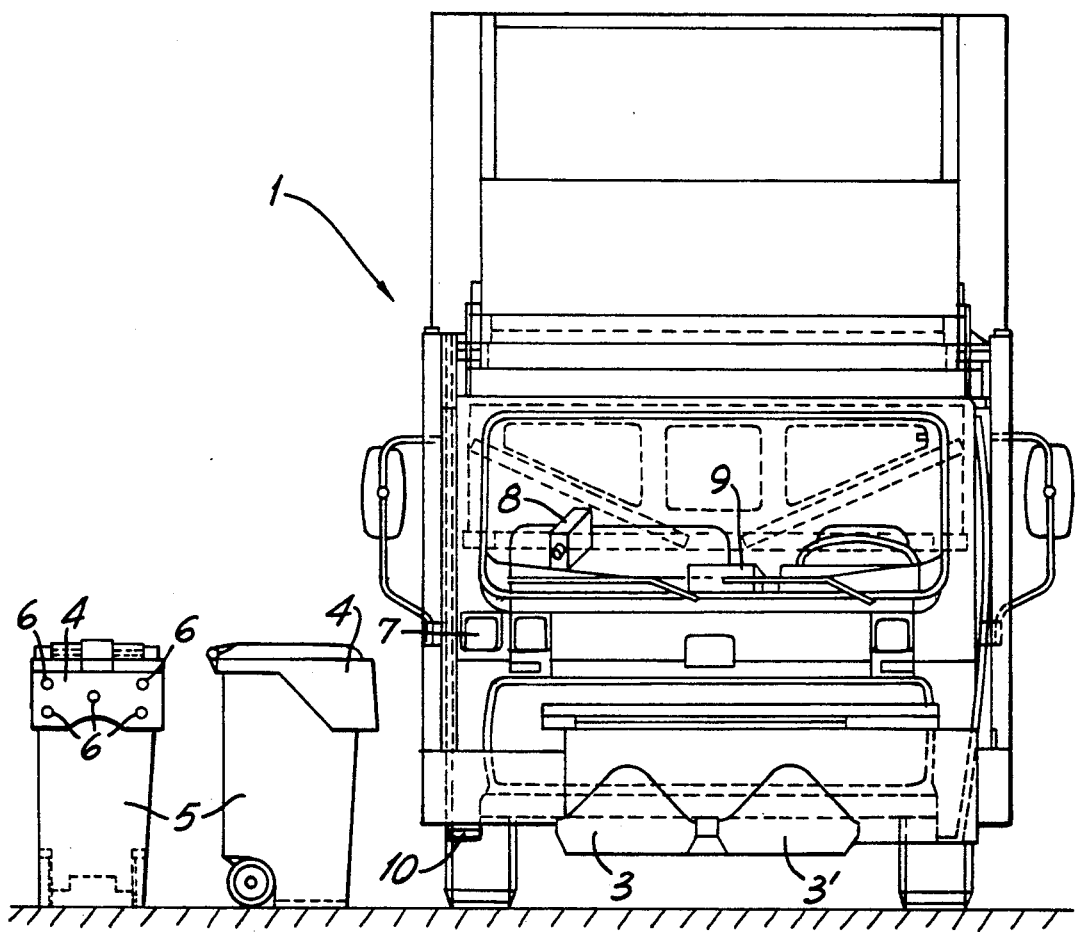
FIG. 1 is a front elevation view showing a garbage collecting truck and a garbage can which is ready to be picked up for being emptied, and a garbage bin which stands beside the first-mentioned one and is provided on its upper skirt with five retroreflective marks.

In a manner which is known from, for example, U.S. Pat. No. 4,715,767 of Dec. 29, 1987, as well as from alternative structural arrangements disclosed in U.S. Pat. No. 5,033,930 of Jul. 23, 1990 and European 0,327,948 of Feb. 1, 1989, corresponding thereto and for that reason is not described in detail, the garbage collecting truck 1 is provided, on a pivotally outwardly movable arm 2, (FIG. 3) with one or two approximately triangular pick-up claws 3, 3', which are complementary to a receiving pocket, which is defined by an upper skirt 4 and the front wall of the garbage can 5. The pick-up claw 3 is approximately triangular and has an approximately planar front surface and a spherically curved rear surface so that the insertion of the pick-up claw 3 into the complementary receiving pocket will result in a three-dimensional centering of the garbage can 5. A semiconductor camera 8 is provided behind the windshield of the garbage collecting truck and views the region in front of the garbage collecting truck on the right side. A light projector 7 is provided beside the camera 8 and as close as possible thereto and illuminates five sheets provided with a retroreflective coating and which form retroreflective marks 6 and which are attached to the front skirt 4 of the garbage can 5. Four retroreflective marks 6 define the corners of a rectangle. The fifth mark 6 is disposed at the point of intersection of the diagonals of the rectangle.

A monitor 9 is mounted on the instrument panel of the truck and indicates to the driver that the camera 8 views the pattern consisting of the retroreflective marks on the garbage can so that the driver can then enable and activate the means for controlling the automatic picking up.

Figure 2:
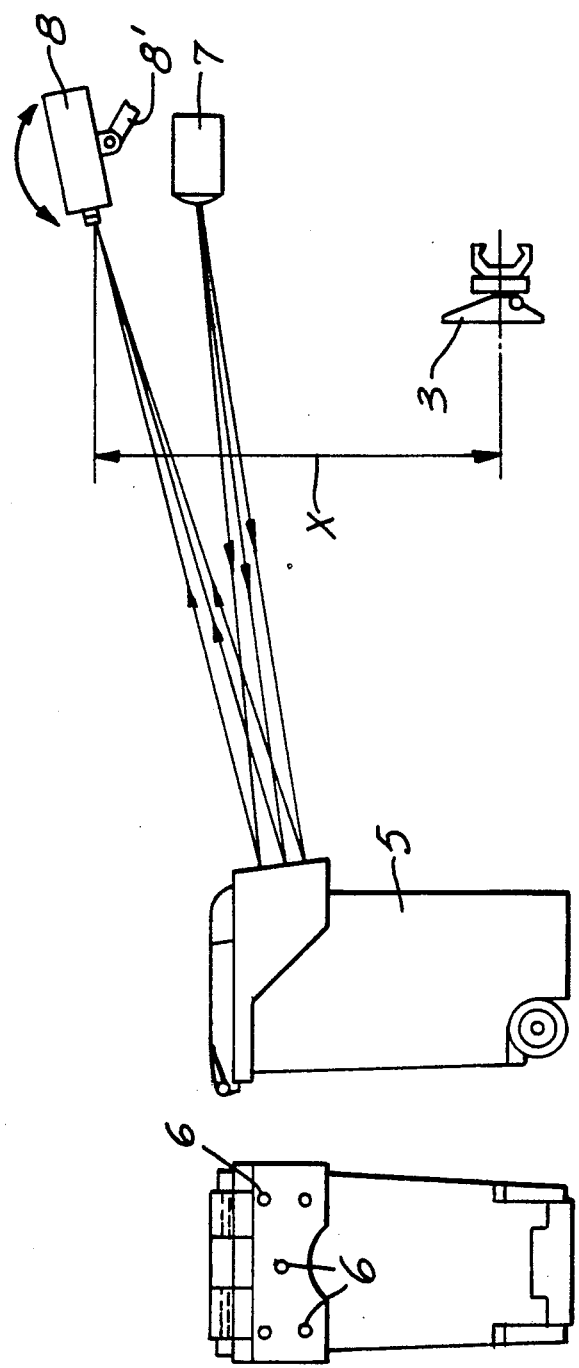
FIG. 2 is a diagrammatic illustration of the light paths used for detection of the retroreflective marks of the garbage can by the area sensor of the camera.

As is apparent from FIG. 2, the light projector 7 irradiates the marks 6 which are to be detected and the rays are reflected to the camera 8. For the sake of simplicity, it has not been taken into account in FIG. 2 that the marks 6 are retroreflective marks, by which the light is reflected in the direction in which the marks are irradiated, independently of the angle of incidence.

The camera 8 is provided with a pivotally movable and adjustable holder 8', by which the distance X from the camera to the pick-up claw 3 in its initial position can be adjusted.

Figure 3:
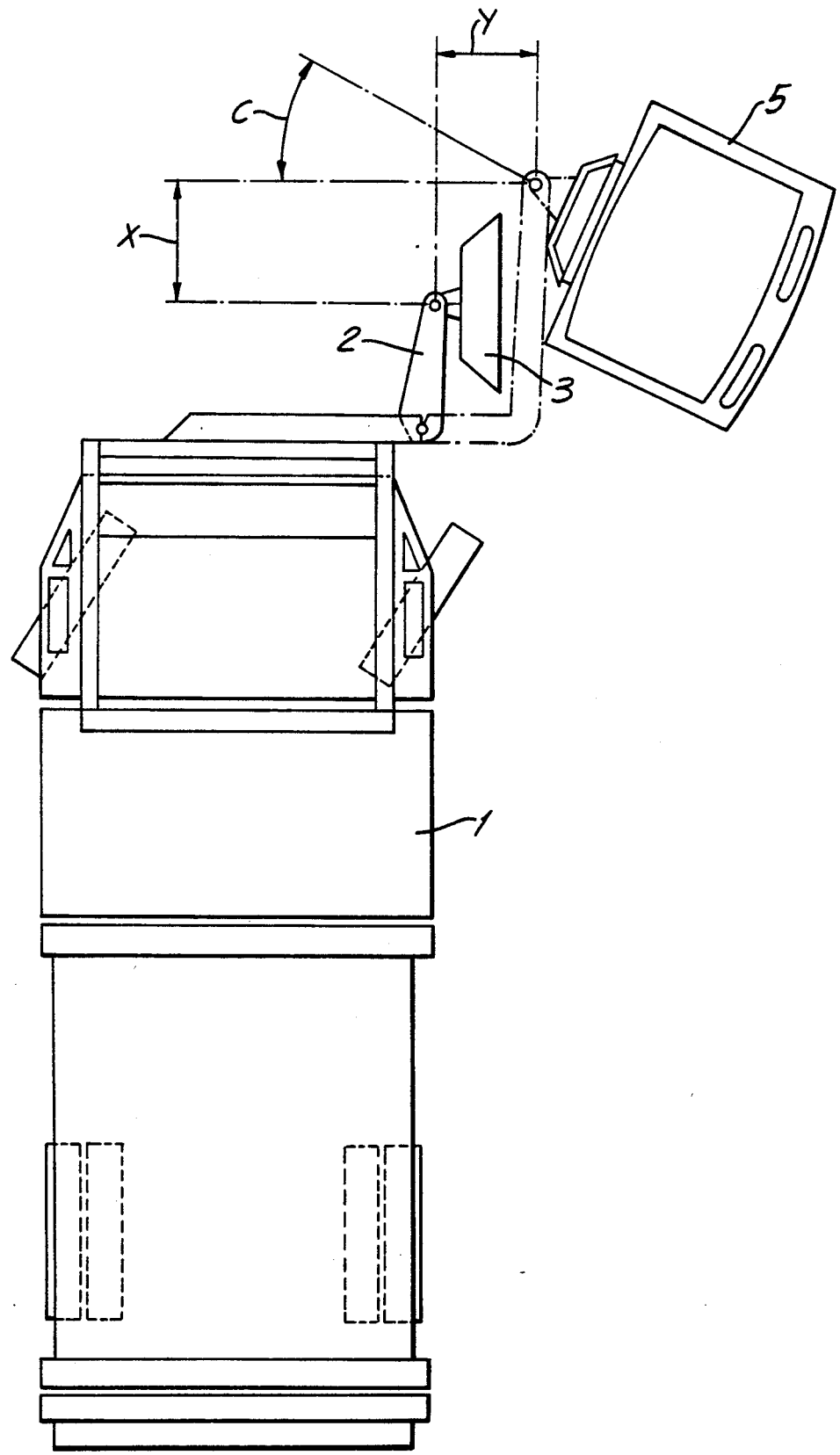
FIG. 3 is a diagrammatic illustration showing the controlled means for actuating the pick-up claw of the garbage collecting truck.

As may be seen in FIG. 3, the lifting and tipping mechanism of the garbage collecting truck is provided with a pivoted pick-up arm 2, which carries the pick-up claw 3. By means of suitable guiding, transmitting and driving means, the pick-up arm 2 can be extended in the direction Y and the pick-up claw 3 can be pivotally moved about its hinge in direction C. By a pivotal movement imparted to the lifting arms of the lifting and tipping mechanism, the pick-up claw 3 can be raised and lowered relative to the surface on which the garbage can 5 is supported. Owing to its degrees of freedom of movement, the pick-up claw 3 can be moved from the position shown in solid lines in FIG. 3 to its pick-up position shown in dotted lines.

Figure 4:
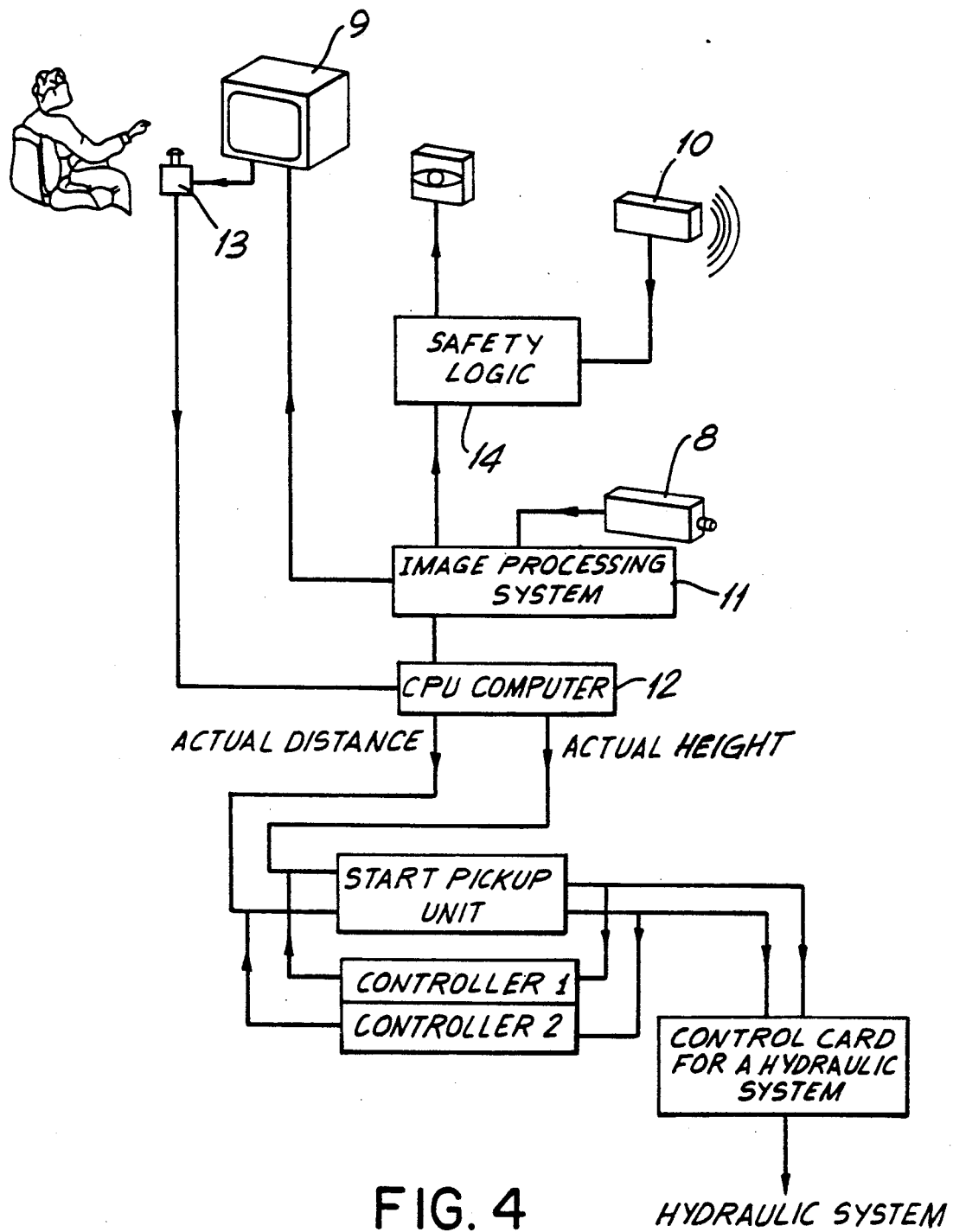
FIG. 4 is a block circuit diagram of the video optical detecting system, according to the invention, including safety-ensuring and processing means.

The system for detecting and controlling is diagrammatically represented in FIG. 4. The camera 8 detects the pattern on retroreflective marks 6, which are attached to the skirt 4 of the can 5. Electronic signal processing means 11 deliver signals to the electronic computer 12 and to the monitor 9 so that the driver can recognize that the camera 8 views the pattern of retroreflective marks 6 and the driver can then actuate the switch 13 to turn on the automatic control. Depending on the data received from the camera 8, the computer 12 will then control the hydraulic system for controlling the pick-up claw 3 so that the coupling, tipping and returning of the can will automatically be effected.

In addition, a radar unit 10 is mounted on the lower portion of the garbage collecting truck 1 on the right side thereof and by means of a safety logic 14 will arrest the pick-up claw when additional movements in the surveillance area are detected.

What is claimed is:

1. A system for determining the spatial position of a garbage can which is provided with at least one receiving pocket defined by an upper skirt and the wall of said garbage can and for receiving a pick-up claw of a lifting and tipping mechanism of a garbage collecting truck by means of a video optical sensor which detects predetermined features of said garbage can and generates signals corresponding to the position of said predetermined features and processes said signals in an electronic computer controlling means for driving said pick-up claw and said lifting and tipping mechanism, said system comprising providing at least three retroreflective marks on said upper skirt of said garbage can in a predetermined pattern and angularly related to each other, a light source for illuminating said retroreflective marks, a semiconductor camera including an area sensor located in juxtaposition to and in spatial association with said light source which detects said predetermined features and inputs them into said electronic computer which initiates said controlling means and drives said pick-up claw and said lifting and tipping mechanism for grasping and moving said garbage can, and a radar unit located on the lower portion of said garbage truck which serves to monitor the range of movement of said pick-up claw and to arrest said pick-up claw when said radar unit detects an additional movement in the area under surveillance.

2. A system according to claim 1, wherein the garbage can has five retroreflective marks arranged thereon.

3. A system according to claim 2, wherein four of the marks constitute the corners of a rectangle and the fifth mark is disposed on the point of intersection of the diagonals of said rectangle.

4. A system according to claim 1, wherein each mark disposed at a corner of the predetermined pattern constitutes a redundant mark.

5. A system according to claim 1, wherein the marks consist of retroreflective sheets.

6. A system according to claim 1, wherein the garbage collecting truck is provided, adjacent to the instrument panel, with a monitor which displays the image taken by the semiconductor camera, said image is evaluated by the computer and an activating switch is provided on said garbage collecting truck to effect control of the means for driving the pick-up claw and the lifting and tipping mechanism through said computer.

7. A system according to claim 1 wherein the semiconductor camera is mounted on a bracket behind the windshield of the garbage collecting truck.

8. A system according to claim 1 wherein the light source is a light projector which is disposed close to the semiconductor camera.

* * * * *